Nov. 16, 1948. H. S. HILL ET AL 2,454,174
METHOD OF CONTROLLING THE POWER INPUT OF
ELECTRICAL CONDUCTANCE HEATER
Filed June 5, 1947
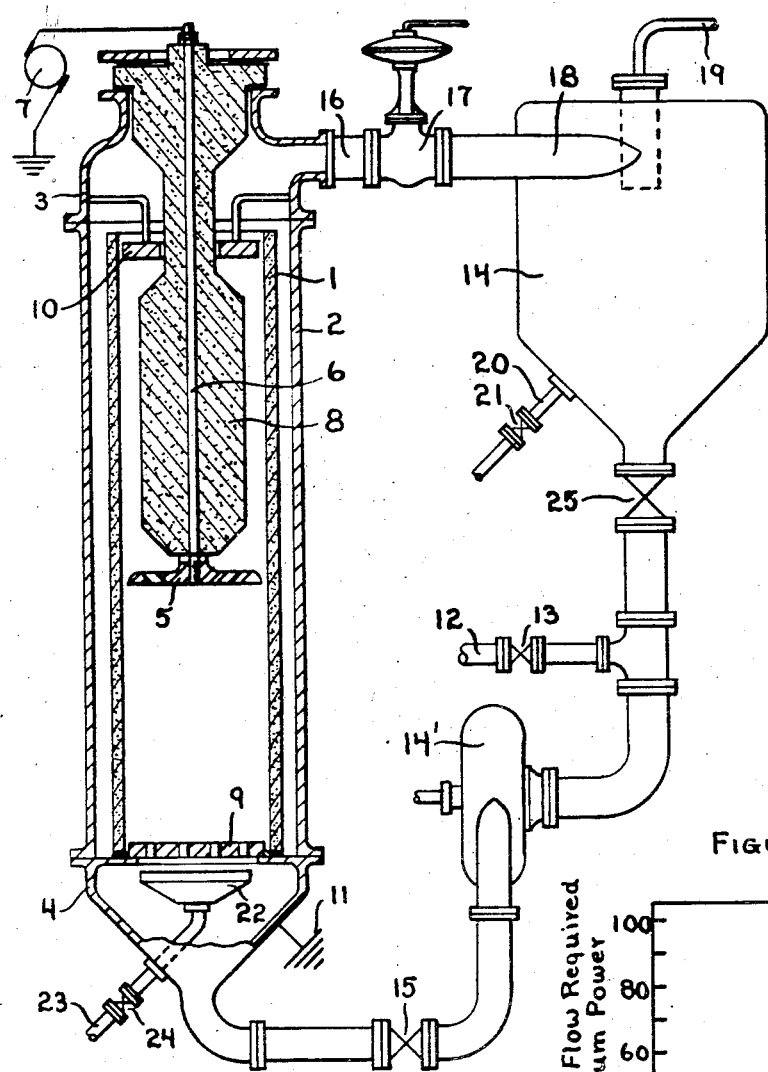
FIGURE 1
FIGURE 2
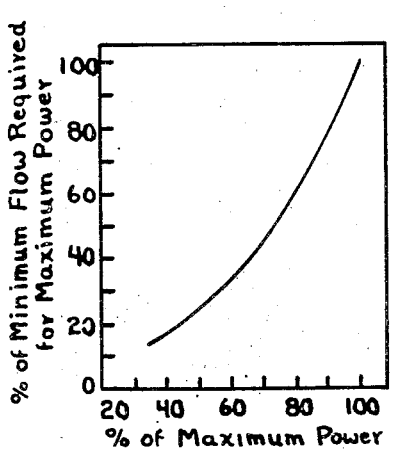
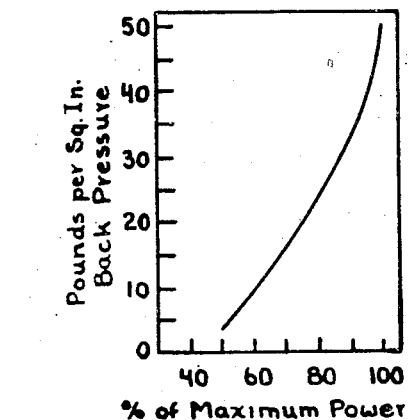
FIGURE 3
Inventors:
Harold S. Hill,
Laurence R. Beath,
by Geo. B. Rawlings
Attorney Patented Nov. 16, 1948

2,454,174

UNITED STATES PATENT OFFICE 2,454,174

METHOD OF CONTROLLING THE POWER INPUT OF ELECTRICAL CONDUCTANCE HEATERS

Harold S. Hill and Laurence R. Beath, Kenogami, Quebec, Canada, assignors to Price Brothers & Company, Limited, Quebec, Quebec, Canada, a corporation of Quebec, Canada Application June 5, 1947, Serial No. 752,688

10 Claims. (Cl. 219—40)

The present invention relates to the convenient control of power input of electrical conductance heaters of the kind in which the fluid to be heated constitutes a part of the electrical circuit and the desired heating is obtained by direct conversion of the electrical energy to heat within the mass of liquid to be heated. The method of our invention is particularly suitable for the control of the power input to heaters of the type disclosed in our copending application Serial No. 747,920.

It is a primary object of the method of our invention to provide a method of control of power input to electrical conductance heaters which is simple and reliable in operation.

Another objective of the method of our invention is the provision of a power control means for electrical conductance heaters which will eliminate the necessity for electrical control means external to the heater such as rheostats, variable tap transformers, etc.

The method of our invention is applicable to that class of electrical conductance heaters in which the interelectrode space has a definite volume which is always essentially filled by the conducting body of liquid. An example of this class of heater is that described in our copending application referred to above. In such a heater the interelectrode space is confined within an insulating shell or tube through which the liquid to be heated is caused to flow so that the conducting body of liquid essentially fills the interelectrode space which is defined and limited by the electrodes and the confining shell.

Basically, our method of controlling electric power input to such heaters comprises providing a dispersed gas or vapor phase in the body of conducting liquid filling the interelectrode space, and controlling as desired the amount of this gas or vapor phase. It will be apparent, that the greater the amount of non-conducting gaseous phase provided in the conducting body of the liquid occupying the defined interelectrode space, the less will be the actual amount of conducting liquid in that space, and the lower will be the amount of electric current conducted by the liquid, and vice versa. Controlled variation of the amount of the dispersed gaseous phase, therefore, produces a corresponding inverse variation in the amount of electric power drawn by the heater from a constant potential power source. Thus, the method of our invention provides a simple and effective way of controlling the power input to an electric conductance heater to meet varying operating demands.

The mode of application of our method may be readily adapted to suit the requirements of a large number of specific heating conditions. To further illustrate our invention, typical examples will be described with reference to the drawings in which:

Figure 1 is a partly sectioned elevational view of an electrical conductance heater and associated equipment designed for the evaporation of an electrolyte, and adapted to be controlled as to power input by the method of our present invention.

Figure 2 is a graphical representation of the power control results obtained by the use of our method through control of the rate of electrolyte circulation.

Figure 3 is a graphical representation of the power control results obtained by the use of our method through limitation of the temperature rise in the heater by control of the back pressure in the heater.

In Figure 1 we show at 1 an open-ended tube made of an electrical insulating material enclosed in the pressure vessel made up of the shell 2, upper head 3 and lower head 4. Within the tube 1 is mounted a high tension electrode 5 which is supported on the rod 6, the upper end of which provides for connection to the high tension wire of a power source indicated at 7 with its other terminal grounded. An insulating structure 8 covers that portion of the rod 6 lying within the pressure vessel. An electrode 9 is supported by and electrically connected to the lower head 4 near the lower end of tube 1. A second grounded electrode 10 is supported from and electrically connected to the upper head 3 near the upper end of the tube 1. The heads 3 and 4 and shell 2 are electrically grounded as indicated at 11. The electrolyte to be evaporated enters the system through the pipe 12 and the valve 13, and together with circulating electrolyte drawn from the chamber 14 passes successively through the pump 14', the flow control valve 15 and into the heater through the lower head 4. The electrolyte completes the electrical circuit between the high tension electrode 5 and the grounded electrodes 9 and 10, is heated by the electrical current flowing through it and leaves the heater by the pipe 16. It then flows through a variable back-pressure control valve 17 and enters the chamber 14 through the tangential entry connection 18. The mode of entry into chamber 14 produces a centrifugal effect on the entering electrolyte which separates out any steam in the entering liquid stream. Steam is removed through the pipe 19 and the residual electrolyte drops to the bottom of chamber 14 for recirculation. Pipe 20 and valve 21 are provided to draw off the concentrated electrolyte from the evaporative cycle.

By the method of our invention power input to the heater is controlled by providing a controlled amount of dispersed gaseous or vapor phase in the mass of electrolyte lying between the electrodes 5 and 9 or 5 and 10.

This may be done in several ways. In the arrangement of Figure 1, for instance, we may apply our method of control by partially closing the valve 15 to so restrict the rate of flow of electrolyte to the heater that the electrolyte cannot absorb as sensible heat all of the heat generated. The heat not so absorbed necessarily causes the liquid to boil, thus producing in the liquid between the electrodes a dispersed vapor phase scattered as small bubbles throughout a part at least of the conducting liquid. The presence of a vapor phase necessarily displaces, from the fixed volume of the active space lying within the tube 1 and between the electrodes 9 and 10, some of the conducting electrolyte and the resistance of the circuit is thereby increased.

In consequence of the increased resistance the power consumption will be reduced. An automatic balance among the electrolyte flow rate, proportion of vapor evolved, and the power input is reached almost instantaneously. It will be apparent that in this way the ratio of vapor to liquid in the active space of the heater may be regulated at will by variations in the electrolyte flow rate as controlled by the valve 15, and that corresponding, inverse regulation of the power input will be obtained.

The control of the proportion of vapor in the conducting liquid may also be obtained in another way. Referring again to Figure 1, it will be seen that the liquid is withdrawn from chamber 14 and pumped to the heater, returning to chamber 14 through the back pressure control valve 17. The liquid leaving the chamber 14 is at a temperature corresponding approximately to its boiling temperature at the pressure existing in chamber 14. The pump 14' provides and the back-pressure valve 17 maintains a pressure on the electrolyte in the heater in excess of the pressure in the chamber 14. This pressure increase causes an increase in the boiling temperature of the liquid in the heater relative to that of the liquid in the chamber 14, and the degree of this increase regulates the quantity of sensible heat which a unit mass of the electrolyte can absorb before boiling ensues. Thus at a given rate of electrolyte circulation the degree of vapor generation required in the current-conducting body of liquid to obtain a desired power input can be had through adjustment of the valve 17 which controls the back-pressure and, thereby, the excess of hydrostatic pressure in the heater over the vapor pressure of the entering liquid which in turn governs its sensible heat capacity, and the amount of boiling and power regulation.

The controlled degree of vapor generation in the conducting liquid, as required in carrying out our invention, may also be obtained by controllably varying both the rate of fluid flow and the back-pressure simultaneously. This mode of operation of our method is of particular value when an unusually wide range of power input control is desired. In this case the flow rates and the back pressure may be varied simultaneously but independently of one another, or their controls may be linked by known means in such a way that for each flow rate a corresponding specific back pressure is maintained. When so linked, either flow or back-pressures may be made the primary variable and the corresponding specific back-pressures or flows are then assured by the linkage means.

The method of our invention provides a very flexible control of power input applicable over a wide range. It will be apparent that the maximum power drawn by a given heater of the type described is had under the condition where there is no gas or vapor phase at all in the conducting liquid. The method of our invention controls the power input downwardly as desired from this maximum, and the minimum point to which control can be so carried is that where, in practical operation, the amount of gas or vapor phase in the conducting liquid becomes so great as to seriously interfere with the steady and continuous flow of the electric current. The practical range of control by our method depends upon design factors of the heater and on the conditions of the particular service in which it is employed. In general though, satisfactory operation is had, using our method of control, down to a lower limit which may be from 10% to 50% of the maximum power, according to circumstances. We do not, therefore, limit our invention to any particular range or degree of control.

In the case of applying our method of power control through controlled variation of the rate of flow of the conducting liquid through the interelectrode space, a typical relationship between the flow, expressed as a percentage of the minimum flow required for maximum power, and the power, expressed as a percentage of the maximum power, is given in Figure 2. The exact power-flow relationship may vary from one heater to another according to circumstances, but the curve of Figure 2 is illustrative as to general trend of the relationship to be expected.

When our method of control is applied by varying the back-pressure on the heater while maintaining constant the electrolyte flow rate through the heater, the power input control is indicated by the curve of Figure 3 in which back pressure has been plotted against the corresponding values of power input expressed as a percentage of the maximum power. A similar, but not necessarily identical curve would be obtained for any specific combination of heater, flow, etc.

In the foregoing illustrations of the method of our invention, we have indicated the use of a vapor phase generated from the conducting liquid itself to serve as the non-conducting medium which partially displaces the liquid from the interelectrode space and so governs the resistance and power consumption of the heater. In a third mode of application of our method we regulate power input to the electrolyte mass between the electrodes by bubbling into the electrolyte stream flowing to the heater a controlled volume of substantially inert gas. The added gas bubbles serve to displace electrolyte from the active interelectrode space of the heater, increase the circuit resistance, and reduce power consumption. By suitable adjustment of the volumetric flow rates of the electrolyte and the gas it is possible to vary the power input through a wide range as desired. Any suitable gas may be used in this way although it is desirable that the gas selected have a low solubility in and substantial chemical inertness towards the electrolyte. This variant of our method is of particular value in providing power control where boiling of the electrolyte must be avoided.

In applying our method of control through addition of an inert gas, we may provide, as shown in Figure 1, a sparger 22 by which gas entering through the pipe 23 and valve 24 is dispersed and bubbled out into the electrolyte stream entering the active space of the heater. Operating in this way the valve 25 at the discharge end of chamber 14 may be closed and the electrolyte to be heated is then added through the pipe 12 and valve 13 and pumped to the heater where the requisite proportion of inert gas is added to it through the sparger 22 to regulate the power input as required to obtain the desired temperatrue rise in the electrolyte. The heated electrolyte-gas mixture then passes into the chamber 14 where the gas and liquid are separated, the heated liquid being removed from the system through pipe 20 and valve 21 while the gas is drawn off through the pipe 19.

We have described the application of our method of control with reference to the conductance heater shown in Figure 1, but it will be obvious that the method is equally applicable to other electrical conductance heaters of the same broad class; i. e., the type of heaters in which the interelectrode space is of defined constant volume and is always substantially filled with current-carrying liquid. Our method is also applicable to heaters of this class when used in groupings of two or three in connection with two or three phase power.

Having described the method of our invention for which we desire the protection of Letters Patent, we claim:

1. The method of power control in electrical conductance heating of a liquid for its evaporative concentration, which comprises continuously passing the conducting liquid through the interelectrode space maintained substantially full of the liquid, maintaining on the liquid a pressure such that boiling of the liquid occurs in said space to supply a dispersed vapor phase in the conducting liquid, regulating the amount of said boiling by regulating the rate of flow of the liquid passing through said space, separating the vapor from the mixture of liquid and vapor leaving said space, and recycling the residual liquid through said space.

2. The method of regulating the power input of an electrical conductance heater of the type in which the liquid to be heated moves by forced circulation through an insulating tube having grounded electrodes adjacent its ends and a high tension electrode within said tube and between said grounded electrodes, which comprises supplying the conducting liquid under pressure to one end of the heater at a regulated rate to cause the formation of a dispersed vapor phase in the conducting liquid in an amount proportioned inversely to said rate of supply thereby to displace conducting liquid occupying the space between the high tension electrode and either of said grounded electrodes in an amount proportioned to the amount of the dispersed vapor phase, withdrawing the mixture of liquid and vapor from the opposite end of the heater, separating the vapor therefrom, and recycling the residual liquid through the heater.

3. The method of controlling the power input to electrical conductance heaters for liquids, which comprises providing a dispersed gas or vapor phase within the liquid which conducts the electric current to cause an increase of electrical resistance of the liquid part of the electrical circuit, and regulating said increase of electrical resistance by regulating the proportion of the gas or vapor phase dispersed within the conducting liquid while maintaining the total volume occupied by the conducting liquid and the gas or vapor phase dispersed therein substantially constant.

4. The method of controlling the power input to electrical conductance heaters for liquids, which comprises dispersing in the liquid which conducts the electric current a gas substantially insoluble in said liquid to cause an increase of electrical resistance of the liquid part of the electrical circuit, and regulating said increase of electrical resistance by regulating the amount of said gas dispersed in said liquid while maintaining the total volume occupied by the conducting liquid and the gas dispersed therein substantially constant.

5. The method of controlling the power input to electrical conductance heaters for liquids, which comprises generating a controlled proportion of a vapor phase dispersed in the conducting liquid by causing a controlled rate of boiling of said liquid while maintaining the volume occupied by the conducting liquid and the vapor phase dispersed therein substantially constant thereby to control the electrical resistance of the liquid part of the electric circuit.

6. The method of power control in electrical conductance heating of a liquid, which comprises providing a dispersed gas or vapor phase within the conducting liquid filling the interelectrode space, and controllably varying the proportion of said dispersed gas or vapor phase while maintaining the interelectrode space substantially full of the conducting liquid and the gas or vapor phase dispersed therein thereby to control the electrical resistance of the liquid part of the electrical circuit and in turn the amount of electric current conducted therethrough.

7. A method of regulating the power input of electrical conductance heaters of the type in which the liquid to be heated moves by forced circulating through an insulating tube having grounded electrodes adjacent its ends and a high tension electrode within said tube and between said grounded electrodes, which comprises providing in the liquid flowing between said electrodes a controlled amount of a gas or vapor phase dispersed in the liquid while maintaining said tube substantially filled with the liquid and the gas or vapor phase dispersed therein thereby to regulate the electrical resistance of the conducting liquid path between said electrodes and thereby control the electrical power drawn by the heater.

8. The method of regulating the power input of electrical conductance heaters having a confined interelectrode space, which comprises causing the conducting liquid to flow through and substantially to fill said space, maintaining on the liquid a pressure such that boiling of the liquid occurs in said space to supply a dispersed vapor phase in the conducting liquid, and regulating the rate of said boiling by regulating the rate of flow of said liquid through said space while maintaining said space substantially full of said liquid and the vapor phase dispersed therein thereby to control the electrical resistance of the liquid part of the electrical circuit and in turn the amount of electric current conducted therethrough.

9. The method of regulating the power input of electrical conductance heaters having a confined interelectrode space, which comprises causing the conducting liquid to flow through and substantially to fill said space, said flow being at such a rate that boiling of the liquid occurs in said space to supply a dispersed vapor phase in the conducting liquid, and regulating the rate of said boiling by regulating the amount of pressure on the liquid in said space while maintaining said space substantially full of the conducting liquid and the vapor phase dispersed therein thereby to control the electrical resistance of the liquid part of the electrical circuit and in turn the amount of electric current conducted therethrough.

10. The method of regulating power input to electrical conductance heaters having a confined interelectrode space, which comprises causing the conducting liquid to flow through and substantially to fill said space, regulating the rate of flow of the liquid through said space and regulating the pressure on the liquid in said space all in a manner effective to cause a regulated rate of boiling of the liquid and thereby to provide a regulated amount of dispersed vapor phase in the liquid conducting the electric current while maintaining said space substantially full of the conducting liquid and the vapor phase dispersed therein whereby the electrical resistance of the liquid part of the electrical circuit is controlled.

HAROLD S. HILL.
LAURENCE R. BEATH.

REFERENCES CITED

The following references are of record in the file of this patent:

UNITED STATES PATENTS

| Number | Name | Date |
|---|---|---|
| 1,004,608 | Wallmann | Oct. 3, 1911 |
| 1,941,020 | Poindexter | Dec. 26, 1933 |
| 2,006,631 | Eaton | July 2, 1935 |